(12) United States Patent
Weng

(10) Patent No.: US 11,425,316 B2
(45) Date of Patent: Aug. 23, 2022

(54) IMAGE FUSION METHOD, IMAGE CAPTURING APPARATUS, AND MOBILE PLATFORM SYSTEM

(71) Applicant: SZ DJI TECHNOLOGY CO., LTD., Shenzhen (CN)

(72) Inventor: Chao Weng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/033,352

(22) Filed: Sep. 25, 2020

(65) Prior Publication Data

US 2021/0014430 A1 Jan. 14, 2021

Related U.S. Application Data

(63) Continuation of application No. PCT/CN2018/080508, filed on Mar. 26, 2018.

(51) Int. Cl.
*H04N 7/18* (2006.01)
*H04N 5/265* (2006.01)
*G06T 7/00* (2017.01)
*H04N 5/225* (2006.01)
*H04N 5/232* (2006.01)

(52) U.S. Cl.
CPC ........... *H04N 5/265* (2013.01); *G06T 7/0002* (2013.01); *H04N 5/2258* (2013.01); *H04N 5/23216* (2013.01); *G06T 2207/10048* (2013.01); *G06T 2207/30168* (2013.01); *H04N 5/2252* (2013.01)

(58) Field of Classification Search
CPC . G06T 2207/10048; G06T 2207/30168; G06T 7/0002; G06T 2207/20221; G06T 5/50; G06T 2207/10064; G06T 2207/20016; G06T 2207/10024;
(Continued)

(56) References Cited

U.S. PATENT DOCUMENTS 4,742,552 A 5/1988 Andrews
2004/0010192 A1* 1/2004 Benaron ............... B82Y 10/00
600/431

(Continued)

FOREIGN PATENT DOCUMENTS

| CN | 103345735 A | 10/2013 |
|----|-------------|---------|
| CN | 203931172 U | 11/2014 |
| CN | 104618709 A | 5/2015 |
| CN | 205080731 U | 3/2016 |

(Continued)

OTHER PUBLICATIONS

The World Intellectual Property Organization (WIPO) International Search Report for PCT/CN2018/080508 dated Dec. 29, 2018 6 pages.

*Primary Examiner* — Masum Billah
(74) *Attorney, Agent, or Firm* — Anova Law Group, PLLC

(57) ABSTRACT

An image fusion method includes acquiring a trigger signal for flat-field correction, controlling a first image acquisition device to start a flat-field correction function to perform a flat-field correction process on the first image acquisition device according to the trigger signal for the flat-field correction, and obtaining a fused image in the flat-field correction process according to an infrared image acquired by the first image acquisition device and a visible light image acquired by a second image acquisition device. The first image acquisition device does not output infrared images during the flat-field correction process.

18 Claims, 2 Drawing Sheets

(58) Field of Classification Search
CPC .. G06T 7/12; G06T 7/13; G06T 7/194; H04N 5/2252; H04N 5/2258; H04N 5/23203
USPC ........................................................ 212/284
See application file for complete search history.

(56) References Cited

U.S. PATENT DOCUMENTS

2013/0195344 A1* 8/2013 Marquiss ........... G01N 21/6454
382/133
2016/0156880 A1* 6/2016 Teich .................... H04N 5/225
348/82

FOREIGN PATENT DOCUMENTS

| | | |
|---|---|---|
| CN | 205449295 U | 8/2016 |
| CN | 106355809 A | 1/2017 |
| CN | 107197122 A | 9/2017 |

* cited by examiner

IMAGE FUSION METHOD, IMAGE CAPTURING APPARATUS, AND MOBILE PLATFORM SYSTEM

CROSS-REFERENCE TO RELATED APPLICATION

This application is a continuation of International Application No. PCT/CN2018/080508, filed on Mar. 26, 2018, the entire content of which is incorporated herein by reference.

TECHNICAL FIELD

The present disclosure relates to the technical field of movable platforms, in particular to an image fusion method, an image capturing apparatus, and a mobile platform system.

BACKGROUND

Image fusion refers to the combination of complementary information from multiple images of the same scene into one image. Compared with any single source image, the resulting image can have a more comprehensive and accurate description.

The fusion of infrared and visible light images has been widely used due to its particularity of convenience in aerospace and monitoring. The visible light sensor can collect the reflected light with rich appearance information to better establish a determination model. The infrared sensor mainly captures the thermal radiation emitted by the object, which is not subject to lighting changes or concealment. Accordingly, it can work day and night and overcome some obstacles to find certain target. Infrared images have lower spatial resolution than visible light images. The appearance features in the visible light image, such as texture information, are often lost, while in the corresponding infrared image, the texture information hardly affects the heat emitted by the object. Therefore, it is beneficial to integrate thermal radiation and texture information into one image.

However, the acquisition of infrared images is greatly affected by natural factors such as wind and atmospheric pressure, and the temperature measurement accuracy of the image capturing apparatus can be reduced after a long time operation which results in poor image fusion effects.

SUMMARY

According to one aspect of the present disclosure, there is provided an image fusion method. The method includes acquiring a trigger signal for flat-field correction, controlling a first image acquisition device to start a flat-field correction function to perform a flat-field correction process on the first image acquisition device according to the trigger signal for the flat-field correction, and obtaining a fused image in the flat-field correction process according to an infrared image acquired by the first image acquisition device and a visible light image acquired by a second image acquisition device. The first image acquisition device does not output infrared images during the flat-field correction process.

According to another aspect of the present disclosure, there is provided an image capturing apparatus. The image capturing apparatus includes a first image acquisition device, a second image acquisition device, and a processor. The process is configured to: acquire a trigger signal for flat-field correction; according to the trigger signal for the flat-field correction, control a first image acquisition device to start a flat-field correction function to perform flat-field correction on the first image acquisition device; and obtain a fused image in the flat-field correction process according to an infrared image acquired by the first image acquisition device and a visible light image acquired by a second image acquisition device. The first image acquisition device does not output infrared images during the flat-field correction process.

BRIEF DESCRIPTION OF THE DRAWINGS

In order to explain the embodiments of the present disclosure or the technical solutions in the existing technology more clearly, the following will briefly introduce the drawings that need to be used in the description of the embodiments or the existing technology. Apparently, the drawings in the following description are some embodiments of the present disclosure. For those of ordinary skill in the art, other drawings can be obtained based on these drawings without creative efforts.

DETAILED DESCRIPTION OF THE EMBODIMENTS

Figure 1:
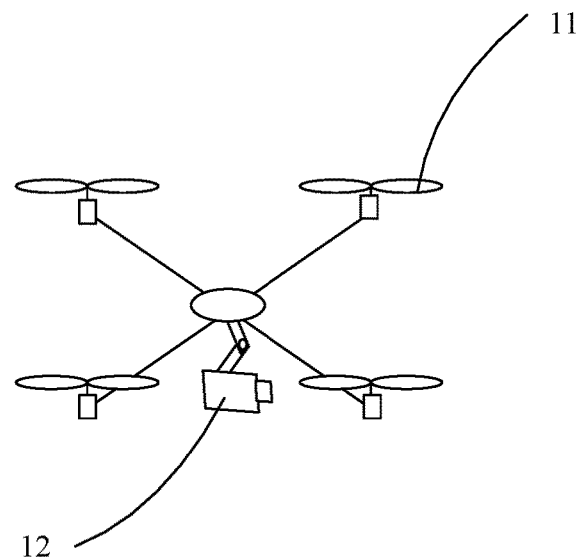
FIG. 1 is a structural diagram of a mobile platform system according to an embodiment of the present disclosure.

The disclosure provides an image fusion method, an image capturing apparatus and a mobile platform system. FIG. 1 is a structural diagram of a mobile platform system according to the present disclosure. As shown in FIG. 1, the mobile platform system may include: a mobile platform 11 and an image capturing apparatus 12. The image capturing apparatus 12 can be mounted on the mobile platform 11. It should be noted that the image capturing apparatus 12 may be disposed at the mobile platform 11, and the image capturing apparatus 12 may also be an apparatus independent of the mobile platform 11. The mobile platform 11 and the image capturing apparatus 12 may communicate based on a communication protocol in a wireless or wired manner. The disclosure does not limit the types of the mobile platform 11 and the image capturing apparatus 12. In some embodiments, the mobile platform 11 may be an unmanned aerial vehicle (UAV), an unmanned car, or the like. The UAV may be a rotorcraft, for example, a multi-rotor aircraft propelled by multiple propulsion devices through the air. The image capturing apparatus 12 may include one or more of a camera, a video camera, or the like.

The technical solutions in the embodiments of the present disclosure will be clearly and completely described below in conjunction with the accompanying drawings in the embodiments of the present disclosure. Apparently, the described embodiments are some of the embodiments of the present disclosure, rather than all of them. Based on the embodiments of the present disclosure, all other embodiments obtained by those of ordinary skill in the art without creative efforts shall fall within the scope of the disclosure.

Figure 2:
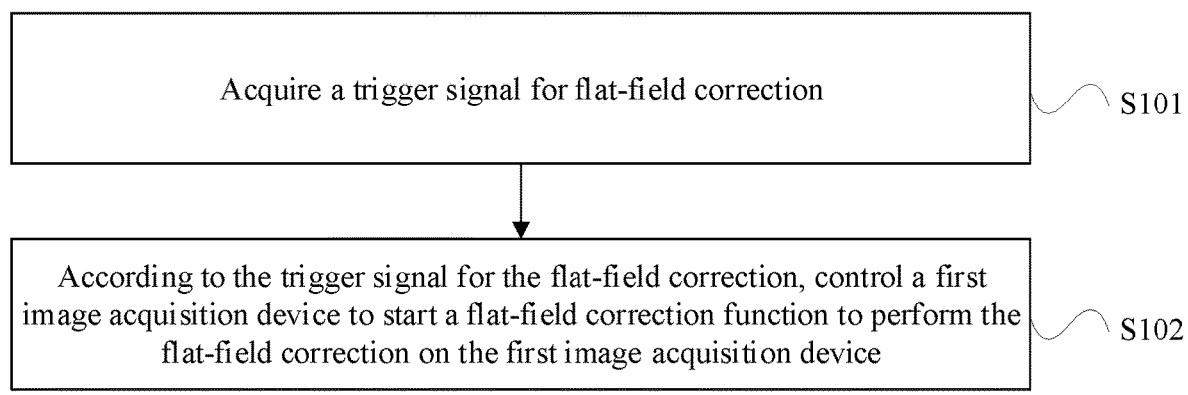
FIG. 2 is a flowchart of an image fusion method according to an embodiment of the present disclosure.

FIG. 2 is a flowchart of an image fusion method according to an embodiment of the present disclosure. In the image fusion method provided in this embodiment, the execution body may be an image capturing apparatus. The image capturing apparatus may include a first image acquisition device (e.g., an infrared camera) and a second image acquisition device (e.g., a visible-light camera). As shown in FIG. 2, the image fusion method provided in this embodiment can be used to fuse an infrared image acquired by the first image acquisition device and a visible light image acquired by the second image acquisition device to obtain a fused image. The image fusion method may include:

S101: Acquiring a trigger signal for flat-field correction.

In this step, the trigger signal for flat-field correction can be acquired to trigger the first image acquisition device to start a flat-field correction function during the image fusion process. The image fusion process may be a process of outputting fused images frame by frame according to images captured by the two image acquisition devices. A frame, as used herein, may refer to image(s) captured at a specific moment. For example, a fused image may be a combination of an infrared image and a visible light image of the same frame (i.e., captured at the same moment).

In this embodiment, the flat-field correction function can be triggered automatically or manually. For the automatic triggering of the flat-field correction function, the trigger signal for the flat-field correction can be obtained when the existing conditions for automatically starting the flat-field correction function are met.

In some embodiments, in an implementation manner, acquiring the trigger signal for the flat-field correction may include acquiring a flat-field correction trigger signal input when the user operates a trigger button of the image capturing apparatus.

This implementation is suitable for the manual triggering of the flat-field correction. Specifically, a trigger button is disposed at the image capturing apparatus. When the user operates the trigger button, the trigger signal for the flat-field correction input by the user via the trigger button can be obtained.

This embodiment does not limit the implementation of the trigger button. In some embodiments, the trigger button may be a physical button disposed at the image capturing apparatus or a virtual button displayed on the image capturing apparatus. The user's operations on the trigger button can be different when the triggers buttons are different. For example, when the trigger button is a physical push-button disposed at the image capturing apparatus, the user can operate the trigger button by pressing the trigger button once. When the trigger button is a physical toggle-button set disposed at the image capturing apparatus, the user can operate the trigger button by toggling the trigger button once. When the trigger button is a virtual button displayed on the image capturing apparatus, the user can operate the trigger button by clicking or double-clicking the trigger button.

It should be noted that the first image acquisition device and the second image acquisition device can be combined into an integral device (e.g., the image capturing apparatus). For example, an image sensor of the first image acquisition device and an image sensor of the second image acquisition device can be placed in the same housing and mounted by a supporting mechanism, e.g., a gimbal. Alternatively, the first image acquisition device and the second image acquisition device may be separate devices, and two supporting mechanisms, e.g., gimbals, may be used for mounting.

In some embodiments, in another implementation manner, acquiring the trigger signal for the flat-field correction may include receiving the trigger signal for the flat-field correction sent by a control device through a communication interface.

Specifically, a communication interface may be disposed at the image capturing apparatus. The image capturing apparatus may receive the trigger signal of the flat-field correction through the communication interface. In some embodiments, the control device may include any one of the following: a mobile platform, a remote-control device, and a terminal device installed with an application program acquired before the mobile platform. The mobile platform can be controlled through the application program and can display the relevant data of the mobile platform. In some embodiments, the communication interface may be a wireless communication interface or a wired communication interface (e.g., a universal serial bus (USB) interface).

S102: According to the trigger signal of the flat-field correction, controlling the first image acquisition device to start a flat-field correction function to perform the flat-field correction on the first image acquisition device.

During the flat-field correction process, the first image acquisition device may not output the infrared image.

Specifically, the temperature measurement accuracy of the image capturing apparatus may be reduced after a long-time operation, which results in a reduction in the quality of the infrared image acquired by the first image acquisition device. By controlling the first image acquisition device to start the flat-field correction function, the flat-field correction can be performed on the first image acquisition device to improve the temperature measurement accuracy, thereby improving the quality of the infrared image acquired by the first image acquisition device and further improving the image fusion effect.

It should be noted that this embodiment does not limit the specific implementation manner of starting the flat-field correction function and may be an existing algorithm. For example, a stopper can be provided inside the camera. When the flat-field correction function is started, the stopper can block the lens to complete the flat-field correction inside the image capturing apparatus.

It can be seen that the image fusion method provided in this embodiment can acquire a trigger signal for the flat-field correction during the image fusion process, and according to the trigger signal for the flat-field correction, the first image acquisition device can be controlled to start the flat-field correction function. Since the flat-field correction function is started during the image fusion process, the temperature measurement accuracy of the first image acquisition device can be improved, the quality of the acquired infrared image can be improved, and the image fusion effect can be improved.

The image fusion method provided in this embodiment may be used to fuse the infrared image acquired by the first image acquisition device and the visible light image acquired by the second image acquisition device to obtain a fused image. During the flat-field correction process, the first image acquisition device may not output infrared images while the second image acquisition device may constantly output visible light images, which involves how to perform the image fusion in the flat-field correction process.

In some embodiments, in the image fusion method provided in this embodiment, in the flat-field correction process, the infrared image acquired by the first image acquisition device and the visible light image acquired by the second image acquisition device can be fused to obtain the fused image, including: obtaining the fusion image in the flat-field correction process according to the infrared image of a previous frame acquired before the start time of the flat-field correction (e.g., a frame preceding the start time of the flat-field correction).

Specifically, during the flat-field correction process, since the first image acquisition device does not output infrared images, the fusion image in the flat-field correction process is obtained according to the infrared image of the previous frame acquired before the start time of the flat-field correction. Using the infrared image of a latest frame before the start of the flat-field correction from the start of the flat-field correction to the end of the flat-field correction, continuity of the infrared image can be maintained to the greatest extent.

In some embodiments, in an implementation manner, obtaining the fused image during the flat-field correction process according to the infrared image of the previous frame acquired before the start time of the flat-field correction may include: determining the infrared image of the previous frame as the fused image in the flat-field correction process.

The display effect of this implementation is that a stationary infrared image may be displayed from the start time to the end time of the flat-field correction, and specifically, the infrared image is the infrared image of the previous frame acquired before the start time of the flat-field correction. Until after the flat-field correction is completed, the fused image obtained by fusing the infrared image acquired by the first image acquiring device and the visible light image acquired by the second image acquiring device can be normally displayed. For users, during the flat-field correction process, the image may change from the fusion image to the infrared image, but the time is shorter, which avoids the asynchronization problem during the fusion with the visible light image.

In some embodiments, in another implementation manner, obtaining the fused image during the flat-field correction process according to the infrared image of the previous frame acquired before the start time of the flat-field correction may include: obtaining a visible light image of a previous frame acquired before the start time of the flat-field correction; and during the flat-field correction process, performing image fusion on the infrared image of the previous frame and the visible light image of the previous frame to obtain the fused image in the flat-field correction process.

In this implementation manner, during the flat-field correction process, image fusion may be performed on infrared image of a last frame and visible light image of a last frame acquired before the start time of the flat-field correction to obtain the fused image in the flat-field correction process.

The display effect of this implementation method is that from the start time to the end time of the flat-field correction, a fixed fusion image can be displayed, and specifically, the fused image is generated by the image fusion of the infrared image and the visible light image of the previous frames acquired before the start time of the flat-field correction. Until after the flat-field correction is completed, the fused image obtained by fusing the infrared image acquired by the first image acquiring device and the visible light image acquired by the second image acquiring device can be normally displayed. For users, during the flat-field correction process, a screen may constantly display the fused image, which avoids the asynchronization problem during the fusion with the visible light image.

In some embodiments, in yet another implementation manner, obtaining the fused image during the flat-field correction process according to the infrared image of the previous frame acquired before the start time of the flat-field correction may include: obtaining visible light image of each frame acquired by the second image acquisition device in the flat-field correction process; and performing image fusion on infrared image of the previous frame and visible light image of each frame to obtain the fused image in the flat-field correction process.

In this implementation manner, during the flat-field correction process, image fusion can be separately performed to infrared image of the last frame acquired before the start time of the flat-field correction and the visible light images that are normally output by the second image acquisition device during the flat-field correction process to obtain the fused image during the flat-field correction process.

The display effect of this implementation method is that from the start time to the end time of the flat-field correction, a fused image can be displayed, which is specifically the fused image generated by the image fusion of the infrared image of the previous frame at the start of the flat-field correction and the visible light image that is normally output. Until after the flat-field correction is completed, the fused image obtained by fusing the infrared image acquired by the first image acquiring device and the visible light image acquired by the second image acquiring device can be normally displayed. For the user, the screen may constantly display the fused image during the flat-field correction process, but because the infrared image is infrared image of the previous frame acquired before the start time of the flat-field correction, there may be an-out-sync problem of the image fusion.

In some embodiments, in the image fusion method provided in this embodiment, during the flat-field correction process, the infrared image acquired by the first image acquisition device and the visible light image acquired by the second image acquisition device can be fused to obtain the fused image, including: determining a fused image of the previous frame acquired before the start time of the flat-field correction as the fused image in the flat-field correction process.

The display effect of this implementation manner is that a stationary fused image can be displayed from the start time to the end time of the flat-field correction, and specifically, the fused image is the fused image of the previous frame acquired before the start time of the flat-field correction. Until after the flat-field correction is completed, the fused image obtained by fusing the infrared image acquired by the first image acquiring device and the visible light image acquired by the second image acquiring device can be normally displayed. For users, the screen may constantly display the fused image during the flat-field correction process, which avoids the asynchronization problem with the visible light image.

In some embodiments, if the image capturing apparatus is disposed at the gimbal, determining the fused image of the previous frame acquired before the start time of the flat-field correction as the fused image in the flat-field correction process may further include: determining whether an image quality detection value of the fused image of the previous frame is lower than a preset threshold.

If it is determined that the image quality detection value of the fused image of the previous frame is higher than or equal to the preset threshold, then the fused image of the previous frame acquired before the start time of the flat-field correction can be determined as the fused image in the flat-field correction process.

If it is determined that the image quality detection value of the fused image of the previous frame is lower than the preset threshold, then attitude information of the gimbal may be acquired. Movement speed of the gimbal may be included in the attitude information or inferred by the attitude information.

If movement speed of the gimbal is determined to be less than a preset speed based on the attitude information, the fused image with a largest image quality detection value among fused images of the previous N frames acquired before the start time of the flat-field correction can be determined as the fused image in the flat-field correction process. N is an integer greater than 1.

Specifically, the image quality of the fused image of the previous frame may be first determined. If the image quality detection value of the fused image of the previous frame is higher than or equal to the preset threshold, it indicates that the image quality of the fused image of the previous frame may be relatively high, and the fused image of the previous frame can be determined as the fused image in the flat-field correction. If the image quality detection value of the fused image of the previous frame is lower than the preset threshold, it indicates that the image quality of the fused image of the previous frame may be relatively low. At this time, the attitude information of the gimbal can be further obtained. If the movement speed of the gimbal is determined to be less than the preset speed according to the attitude information of the gimbal, it indicates that the movement of the gimbal is slow and multi-frame images continuously acquired by the first image acquisition device and the second image acquisition device have little change. The fused image with a largest image quality detection value among fused images of the previous N frames acquired before the start time of the flat-field correction can be determined as the fused image in the flat-field correction process. That is, the fused image with the highest image quality among fused images of the previous N frames can be determined as the fused image in the flat-field correction process.

By determining the quality of the fused image and the movement status of the gimbal, the fused image of one frame among fused images of the previous N frames acquired before the start time of the flat-field correction can be selected as the fused image in the flat-field correction process, which improves the image display effect and enhances the user experience.

The image quality detection value can be used to measure the quality of the image. This embodiment does not limit the implementation of the image quality detection value, and it may be any existing implementation method for measuring the quality of the image.

This embodiment does not limit the specific values of the preset threshold, the preset speed, and N.

In some embodiments, in the image fusion method provided in this embodiment, if the image capturing apparatus is disposed at the gimbal, during the flat-field correction process, the infrared image acquired by the first image acquisition device and the visible light image acquired by the second image acquisition device can be fused to obtain a fused image, including: acquiring the attitude information of the gimbal.

If the movement speed of the gimbal is determined to be less than the preset speed according to the attitude information, the fused image with a largest image quality detection value among fused images of the previous N frames acquired before the start time of flat-field correction can be determined as the fused image in the flat-field correction process. N is An integer greater than 1.

If the movement speed of the gimbal determined according to the posture information is greater or equal to the preset speed, the fused image of the previous frame acquired before the start time of the flat-field correction can be determined as the fused image in the flat-field correction process.

Specifically, the attitude information of the gimbal may be first acquired. If it is determined based on the attitude information of the gimbal that the movement speed of the gimbal is less than the preset speed, it indicates that the movement of the gimbal is slow, and the multi-frame images continuously acquired by the first image acquisition device and the second image acquisition device have little change. At this time, the fused image with a largest image quality detection value among fused images of the previous N frames acquired before the start time of the flat-field correction can be determined as the fused image in the flat-field correction process. That is, the fused image of the frame with the highest image quality among fused image of the previous N frames can be determined as the fused image in the flat-field correction process. If the movement speed of the gimbal is determined to be greater than or equal to the preset speed according to the attitude information of the gimbal, it indicates that the movement of the gimbal is faster, and images of the multiple frames continuously acquired by the first image acquisition device and the second image acquisition device change greatly. At this time, the fused image of the previous frame acquired before the start time of the flat-field correction can be determined as the fused image in the flat-field correction process, which avoids abrupt changes in the image presented to the user.

By determining the movement status of the gimbal, the fused image of one frame among the fused images of the previous N frames acquired before the start time of the flat-field correction may be selected as the fused image in the flat-field correction process, which improves the image display effect and enhances the user experience.

This embodiment provides an image fusion method for fusing an infrared image acquired by a first image acquisition device and a visible light image acquired by a second image acquisition device to obtain a fused image, including: acquiring a trigger signal for flat-field correction; and according to the trigger signal for the flat-field correction, controlling the first image acquisition device to start the flat-field correction function to perform the flat-field correction on the first image acquisition device. During the flat-field correction, the first image acquisition device does not output infrared images. In the image fusion method provided in this embodiment, by starting the flat-field correction function during the image fusion process, the temperature measurement accuracy of the first image acquisition device can be improved, the quality of the acquired infrared image can be improved, and the image fusion effect can be improved.

Figure 3:
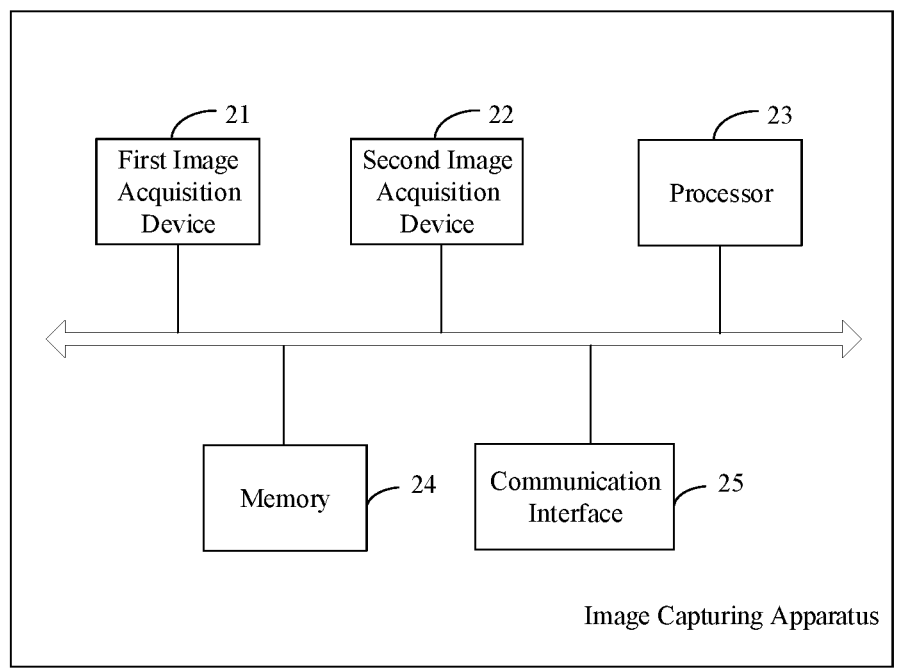
FIG. 3 is a schematic structural diagram of an image capturing apparatus according to an embodiment of the present disclosure.

FIG. 3 is a schematic structural diagram of an image capturing apparatus according to an embodiment of the present disclosure. The image capturing apparatus provided in this embodiment is used to execute the image fusion method provided in the method embodiment of the present disclosure. As shown in FIG. 3, the image capturing apparatus provided in this embodiment may include a first image acquisition device 21, a second image acquisition device 22, and a processor 23. In some embodiments, the image capturing apparatus further includes a memory 24. The memory 24 is configured to store program codes and data acquired by the image capturing apparatus, and the data may include photos and video streams. The processor 23 can call the program code stored in the memory 24. When the program code is executed, the processor 23 can be configured to fuse the infrared image acquired by the first image acquisition device 21 and the visible light image acquired by the second image acquisition device 22 to obtain a fused image. The processor 23 is further configured to acquire a trigger signal for flat-field correction.

According to the trigger signal of the flat-field correction, the first image acquisition device 21 can be controlled to start the flat-field correction function to perform the flat-field correction on the first image acquisition device 21. During the flat-field correction process, the first image acquisition device 21 may not output infrared images.

In some embodiments, the processor 23 is specifically configured to acquire the fused image in the flat-field correction process according to the infrared image of a previous frame acquired before the start time of the flat-field correction.

In some embodiments, the processor 23 is specifically configured to determine the previous infrared image as the fused image in the flat-field correction process.

In some embodiments, the processor 23 is specifically configured to acquire a visible light image of a previous frame acquired before the start time of the flat-field correction.

In the flat-field correction process, the image fusion can be performed on the infrared image of the previous frame and the visible light image of the previous frame to obtain the fused image in the flat-field correction process.

In some embodiments, the processor 23 is specifically configured to obtain visible light image of each frame acquired by the second image acquisition device 22 during the flat-field correction process.

The image fusion can be performed on infrared image of the previous frame and visible light image of each frame to obtain the fused image in the flat-field correction process.

In some embodiments, the processor 23 is specifically configured to determine the fused image of the previous frame acquired before the start time of the flat-field correction as the fused image in the flat-field correction process.

In some embodiments, the image capturing apparatus may be disposed at the gimbal, and the processor 23 is further configured to determine whether the image quality detection value of the fused image of the previous frame is lower than a preset threshold.

If the image quality detection value of the fused image of the previous frame is determined to be lower than the preset threshold, then attitude information of the gimbal can be acquired.

If movement speed of the gimbal is determined to be less than the preset speed according to the attitude information, the fused image with a largest image quality detection value among fused images of the previous N frames acquired before the start time of the flat-field correction can be determined as the fused image in the flat-field correction process. N is an integer greater than 1.

In some embodiments, the image capturing apparatus can be disposed at the gimbal, and the processor 23 is specifically configured to acquire the attitude information of the gimbal.

If the movement speed of the gimbal is determined to be less than the preset speed according to the attitude information, the fused image with a largest image quality detection value among fused images of the previous N frames at the start time of the flat-field correction can be determined as the fused image in the flat-field correction process. The N is an integer greater than 1.

If it is determined according to the attitude information that the movement speed of the gimbal is greater than or equal to the preset speed, the fused image of the previous frame acquired before the start time of the flat-field correction can be determined as the fused image in the flat-field correction process.

In some embodiments, the processor 23 is specifically configured to acquire a trigger signal for flat-field correction that is input when the user operates the trigger button on the image capturing apparatus.

In some embodiments, the trigger button may be a physical button disposed at the image capturing apparatus or a virtual button displayed on the image capturing apparatus.

In some embodiments, the processor 23 is specifically configured to receive the trigger signal sent by a control device through a communication interface 25.

The image capturing apparatus provided in this embodiment is configured to execute the image fusion method provided in the method embodiment of the present disclosure, and its technical principles and technical effects are similar, and will not be repeated here.

The present disclosure also provides a mobile platform system, which may include a mobile platform and an image capturing apparatus provided in the embodiment of the present disclosure.

The image capturing apparatus can be disposed at the mobile platform.

In some embodiments, the mobile platform system may further include a gimbal. The gimbal can be disposed at the mobile platform, and the image capturing apparatus may be disposed at the gimbal.

The mobile platform system provided in this embodiment includes an image capturing apparatus configured to execute the image fusion method provided in the method embodiment of the present disclosure. The technical principles and technical effects are similar and will not be repeated here.

The terms "first", "second", "third", "fourth", etc., if any, in the description and claims of the present disclosure and the above-mentioned drawings are used to distinguish similar objects, and need not be used to describe a specific order or sequence. It should be understood that the data used in this way can be interchanged under appropriate circumstances, so that the embodiments of the present disclosure described herein can be implemented, for example, in a sequence other than those illustrated or described herein. In addition, the terms "including" and "having" and any variations of them are intended to cover non-exclusive inclusions. For example, a process, method, system, product, or device that includes a series of steps or units is not necessarily limited to those clearly listed. Those steps or units may include other steps or units that are not clearly listed or are inherent to the process, method, product, or device.

A person of ordinary skill in the art can understand that all or some of the steps in the foregoing method embodiments can be implemented by a program instructing relevant hardware. The aforementioned program can be stored in a computer readable storage medium. When the program is executed, it executes the steps including the foregoing method embodiments; and the foregoing storage medium includes: ROM, RAM, magnetic disk, or other media that can store program codes such as optical disk.

Finally, it should be noted that the above embodiments are only used to illustrate the technical solutions of the embodiments of the present disclosure, but not to limit them. Although the embodiments of the present disclosure are described in detail with reference to the foregoing embodiments, those of ordinary skill in the art should understand that it is possible to modify the technical solutions described in the foregoing embodiments or equivalently replace some or all of the technical features, and these modifications or replacements do not make the essence of the corresponding technical solutions deviate from the scope of the technical solutions of the embodiments of the present disclosure.

What is claimed is:

1. An image fusion method, comprising:
acquiring a trigger signal for flat-field correction;
according to the trigger signal for the flat-field correction, controlling a first image acquisition device to start a flat-field correction function to perform a flat-field correction process on the first image acquisition device, wherein the first image acquisition device and a second image acquisition device are configured to output, before a start time of the flat-filed correction process and after an end time of the flat-filed correction process, infrared images and visible light images, respectively, the first image acquisition device does not output infrared images during the flat-field correction process, and the second image acquisition device continues to output visible light images during the flat-field correction process; and
obtaining a fused image corresponding to a period of time from the start time to the end time of the flat-field correction process according to an infrared image of a previous frame acquired by the first image acquisition device before the start time of the flat-field correction process and a visible light image acquired by the second image acquisition device before the end time of the flat-field correction process.

2. The method according to claim 1, wherein obtaining the fused image corresponding to the period of time from the start time to the end time of the flat-field correction process includes:
determining the infrared image of the previous frame as the fused image corresponding to the period of time from the start time to the end time of the flat-field correction process.

3. The method according to claim 1, wherein obtaining the fused image corresponding to the period of time from the start time to the end time of the flat-field correction process includes:
obtaining a visible light image of the previous frame acquired before the start time of the flat-field correction; and
during the flat-field correction process, fusing the infrared image of the previous frame and the visible light image of the previous frame to obtain the fused image corresponding to the period of time from the start time to the end time of the flat-field correction process.

4. The method according to claim 1, wherein obtaining the fused image corresponding to the period of time from the start time to the end time of the flat-field correction process includes:
obtaining a visible light image of each frame acquired by a second image acquisition device during the flat-field correction process; and
performing image fusion on the infrared image of the previous frame and the visible light image of each frame acquired by the second image acquisition device during the flat-field correction process respectively to obtain the fused image corresponding to the period of time from the start time to the end time of the flat-field correction process.

5. The method according to claim 1, wherein obtaining the fused image corresponding to the period of time from the start time to the end time of the flat-field correction process includes:
determining a fused image of the previous frame acquired before the start time of the flat-field correction as the fused image corresponding to the period of time from the start time to the end time of the flat-field correction process.

6. The method according to claim 5, further comprising:
before determining the fused image of the previous frame acquired before the start time of the flat-field correction as the fused image corresponding to the period of time from the start time to the end time of the flat-field correction process:
determining whether an image quality detection value of the fused image of the previous frame is lower than a preset threshold;
in response to the image quality detection value of the fusion image of the previous frame being lower than the preset threshold value, acquiring attitude information of a gimbal housing the first image acquisition device and the second image acquisition device; and
according to the attitude information, in response to a movement speed of the gimbal being less than a preset speed, determining a fused image with a largest image quality detection value among fused images of previous N frames acquired before the start time of the flat-field correction as the fused image corresponding to the period of time from the start time to the end time of the flat-field correction process, N being an integer greater than 1.

7. The method according to claim 1, further comprising:
acquiring attitude information of a gimbal housing the first image acquisition device and the second image acquisition device:
according to the attitude information, in response to a movement speed of the gimbal being less than a preset speed, determining a fused image with a largest image quality detection value among fused images of previous N frames acquired before the start time of flat-field correction as the fused image corresponding to the period of time from the start time to the end time of the flat-field correction process, N being an integer greater than 1; and
according to the attitude information, in response to the movement speed of the gimbal being greater than or equal to the preset speed, determining the fused image of the previous frame acquired before the start time of the flat-field correction as the fused image corresponding to the period of time from the start time to the end time of the flat-field correction process.

8. The method according to claim 1, wherein acquiring the trigger signal for the flat-field correction comprises:
acquiring the trigger signal for the flat-field correction input by a user operating a trigger button of an image capturing apparatus, the image capturing apparatus comprising the first image acquisition device and the second image acquisition device.

9. The method according to claim 8, wherein the trigger button is a physical button disposed on the image capturing apparatus or a virtual button displayed on the image capturing apparatus.

10. The method according to claim 1, wherein acquiring the trigger signal for the flat-field correction comprises:
receiving the trigger signal for the flat-field correction sent by a control device through a communication interface.

11. An image capturing apparatus, comprising:
a first image acquisition device;
a second image acquisition device; and
a processor configured to:
  acquire a trigger signal for flat-field correction;
  according to the trigger signal for the flat-field correction, control the first image acquisition device to start a flat-field correction function to perform flat-field correction on the first image acquisition device, wherein the first image acquisition device and the second image acquisition device are configured to output, before a start time of the flat-filed correction process and after an end time of the flat-filed correction process, infrared images and visible light images, respectively, the first image acquisition device does not output infrared images during the flat-field correction process, and the second image acquisition device continues to output visible light images during the flat-field correction process; and
  obtain a fused image corresponding to a period of time from the start time to the end time of the flat-field correction process according to an infrared image of a previous frame acquired by the first image acquisition device before the start time of the flat-field correction process and a visible light image acquired by the second image acquisition device before the end time of the flat-field correction process.

12. The image capturing apparatus according to claim 11, wherein the processor is specifically configured to:
determine the infrared image of the previous frame as the fused image corresponding to the period of time from the start time to the end time of the flat-field correction process.

13. The image capturing apparatus according to claim 11, wherein the processor is specifically configured to:
obtain a visible light image of the previous frame acquired before the start time of the flat-field correction; and
during the flat-field correction process, fuse the infrared image of the previous frame and the visible light image of the previous frame to obtain the fused image corresponding to the period of time from the start time to the end time of the flat-field correction process.

14. The image capturing apparatus according to claim 11, wherein the processor is specifically configured to:
obtain a visible light image of each frame acquired by a second image acquisition device during the flat-field correction process; and
perform image fusion on the infrared image of the previous frame and the visible light image of each frame acquired by the second image acquisition device during the flat-field correction process respectively to obtain the fused image corresponding to the period of time from the start time to the end time of the flat-field correction process.

15. The image capturing apparatus according to claim 11, wherein the processor is specifically configured to:
determine a fused image of the previous frame acquired before the start time of the flat-field correction as the fused image corresponding to the period of time from the start time to the end time of the flat-field correction process.

16. The image capturing apparatus according to claim 15, wherein the processor is further configured to:
determine whether an image quality detection value of the fused image of the previous frame is lower than a preset threshold;
in response to determining the image quality detection value of the fused image of the previous frame being lower than the preset threshold value, acquire attitude information of a gimbal housing the image capturing apparatus; and
according to the attitude information, in response to determining a movement speed of the gimbal being less than a preset speed, determine a fused image with a largest image quality detection value among fused images of previous N frames acquired before the start time of the flat-field correction as the fused image corresponding to the period of time from the start time to the end time of the flat-field correction process, N being an integer greater than 1.

17. The image capturing apparatus according to claim 11, wherein the processor is specifically configured to:
acquire attitude information of a gimbal housing the image capturing apparatus:
  according to the attitude information, in response to determining a movement speed of the gimbal being less than a preset speed, determine a fused image with a largest image quality detection value among fused images of previous N frames acquired before the start time of the flat-field correction as the fused image corresponding to the period of time from the start time to the end time of the flat-field correction process, N being an integer greater than 1; and
  according to the attitude information, in response to determining a movement speed of the gimbal being greater than or equal to the preset speed, determine a fused image of the previous frame acquired before the start time of the flat-field correction as the fused image in the flat-field correction process.

18. The image capturing apparatus according to claim 11, wherein the processor is specifically configured to:
acquire the trigger signal for the flat-field correction input by a user operating a trigger button of the image capturing apparatus.

* * * * *